(12) United States Patent
Devroe (10) Patent No.: US 12,508,627 B2
(45) Date of Patent: Dec. 30, 2025

(54) PARTICLE SEPARATION DEVICE FOR ADDITIVE MANUFACTURE AND ADDITIVE MANUFACTURING APPARATUS

(71) Applicant: ADDUP, Cebazat (FR)

(72) Inventor: Sebastien Devroe, Cebazat (FR)

(73) Assignee: ADDUP, Cebazat (FR)

( * ) Notice: Subject to any disclaimer, the term of this patent is extended or adjusted under 35 U.S.C. 154(b) by 618 days.

(21) Appl. No.: 17/771,304

(22) PCT Filed: Oct. 20, 2020

(86) PCT No.: PCT/FR2020/051892
§ 371 (c)(1),
(2) Date: Apr. 22, 2022

(87) PCT Pub. No.: WO2021/079057
PCT Pub. Date: Apr. 29, 2021

(65) Prior Publication Data
US 2022/0379347 A1 Dec. 1, 2022

(30) Foreign Application Priority Data
Oct. 24, 2019 (FR) ...................................... 1911930

(51) Int. Cl.
*B07B 7/083* (2006.01)
*B01D 45/16* (2006.01)
(Continued)

(52) U.S. Cl.
CPC ............. *B07B 7/083* (2013.01); *B01D 45/16* (2013.01); *B01D 46/02* (2013.01); *B01D 50/20* (2022.01);
(Continued)

(58) Field of Classification Search
CPC .. B07B 9/02; B07B 7/083; B07B 7/10; B01D 45/16; B01D 50/20; B01D 46/02; B33Y 40/00; B22F 12/70
See application file for complete search history.

(56) References Cited

U.S. PATENT DOCUMENTS

| 4,260,478 A | 4/1981 | Hosokawa et al. | |
| 4,470,902 A * | 9/1984 | Yoshimori | ................ B07B 9/02 96/372 |
| 2010/0294863 A1* | 11/2010 | Schindler | ................ B07B 11/02 209/31 |

FOREIGN PATENT DOCUMENTS

| CN | 208303240 U | 1/2019 |
| CN | 109499870 A | 3/2019 |
| CN | 109663919 A | 4/2019 |

OTHER PUBLICATIONS

Cement Industry Environmental Protection Engineering Manual, 5 pages (2008).

(Continued)

*Primary Examiner* — Robert Clemente
(74) *Attorney, Agent, or Firm* — VENABLE LLP (57) ABSTRACT

A device for separating particles contained in a gas stream for selective additive manufacturing and a selective additive manufacturing apparatus are disclosed. The device comprises at least one dry-type aeraulic separator comprising a separating turbine, a speed of rotation of which is variable. The dry-type aeraulic separator selects the particles contained in the gas stream according to a particle size depending on the speed of rotation of the separating turbine. The device also comprises a device for extracting the particles. The dry-type aeraulic separator and the extraction device are in fluidic communication such that a gas stream exiting the dry-type aeraulic separator circulates through the extraction device and such that the gas stream exiting the extraction (Continued)

device circulates through the dry-type aeraulic separator. The device also comprises a device for circulating the gas stream between the dry-type aeraulic separator and the extraction device.

12 Claims, 9 Drawing Sheets

(51) Int. Cl.
    *B01D 46/02*     (2006.01)
    *B01D 50/20*     (2022.01)
    *B01D 53/26*     (2006.01)
    *B07B 7/10*     (2006.01)
    *B07B 9/02*     (2006.01)
    *B22F 12/70*     (2021.01)
    *B33Y 40/00*     (2020.01)

(52) U.S. Cl.
    CPC ............... *B01D 53/26* (2013.01); *B07B 7/10* (2013.01); *B07B 9/02* (2013.01); *B22F 12/70* (2021.01); *B33Y 40/00* (2014.12)

(56) References Cited

OTHER PUBLICATIONS

International Search Report dated Jan. 29, 2021, in corresponding PCT/FR2020/051892 (4 pages).

\* cited by examiner

PARTICLE SEPARATION DEVICE FOR ADDITIVE MANUFACTURE AND ADDITIVE MANUFACTURING APPARATUS

GENERAL TECHNICAL FIELD AND PRIOR ART

The present invention relates to the general field of additive manufacturing; more particularly for manufacturing objects, for example metal objects.

Selective additive manufacturing consists in creating three-dimensional objects by consolidating selected zones in successive layers of pulverulent material (metal or ceramic powder, for example). The consolidated zones correspond to successive cross sections of the three-dimensional object. Consolidation takes place for example layer by layer, through total or partial selective melting carried out using a power source.

The powder, for example a metal powder, is made up of a collection of particles which need to be separated, in particular by size, in order to achieve optimal manufacturing.

It is known, in order to effect this separation of particles, to use a physical sieve with a fixed mesh. This mesh is typically 63 μm (230 US mesh).

Physical sieves have the drawback of not allowing adjustment of the size of the particles to be separated. Moreover, the aeration of the particles on a sieve is low.

Therefore, the present invention aims to remedy these defects by proposing a device for separating particles for additive manufacturing and an additive manufacturing apparatus.

GENERAL SUMMARY OF THE INVENTION

A general aim of the invention is to overcome the limitations of the prior art.

To this end in particular, the invention proposes a device for separating particles for additive manufacturing. The particles are contained in a gas stream. The device comprises at least one dry-type aeraulic separator, the dry-type aeraulic separator comprising a separating turbine, a speed of rotation of which is variable. The dry-type aeraulic separator selects the particles contained in the gas stream according to a particle size depending on the speed of rotation of the separating turbine. The device for separating the particles also comprises a device for extracting the particles contained in the gas stream. The dry-type aeraulic separator and the extraction device are in fluidic communication such that a gas stream exiting the dry-type aeraulic separator circulates through the extraction device and such that the gas stream exiting the extraction device circulates through the dry-type aeraulic separator. The device for separating the particles also comprises a device for circulating the gas stream between the aeraulic separator and the extraction device.

The invention also proposes an assembly comprising a selective additive manufacturing apparatus and a separating device. The selective additive manufacturing apparatus comprises or is connected to the separating device.

In one embodiment, the assembly also comprises a system for distributing pulverulent material, this distribution system being configured to receive particles coming from the separating device.

In one embodiment, the assembly also comprises a device for collecting unused particles, the collecting device being connected to an inlet of the device for separating the particles.

In one embodiment, the assembly also comprises a filtering device fitted between the collecting device and the inlet of the device for separating the particles.

In one embodiment, the filtering device comprises a protective sieve with a mesh size of between 300 μm and 1500 μm.

BRIEF DESCRIPTION OF THE DRAWINGS

Further features and advantages of the invention will become apparent from the following description, which is purely illustrative and non-limiting and should be read in conjunction with the appended figures, in which:

FIG. 2-*a* shows a separating turbine and FIG. 2-*b* a depiction, in graph form, of the relationship between the speed of rotation of the separating turbine and the diameter of the particles separated by the turbine.

FIGS. 7-*a* and 7-*b* show two embodiments of a selective additive manufacturing apparatus.

DESCRIPTION OF ONE OR MORE IMPLEMENTATIONS AND EMBODIMENTS

Figure 1:
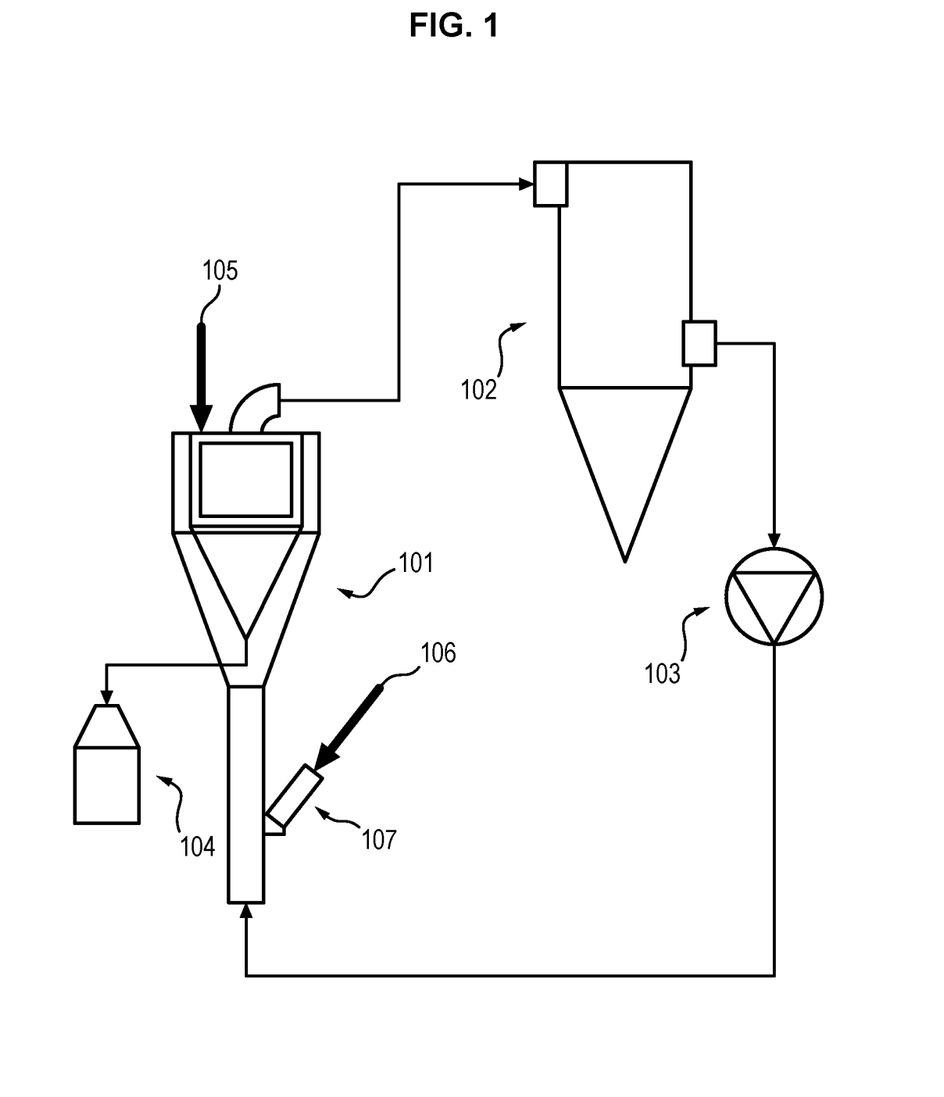
FIG. 1 illustrates a first embodiment of the separating device.

FIG. 1 shows a first embodiment of the device for separating particles, for example metal particles. The particles are contained in a gas stream and are intended to be used for additive manufacturing. This device comprises at least one dry-type aeraulic separator 101; said dry-type aeraulic separator 101 comprises a separating turbine with a variable speed of rotation and selects the particles contained in said gas stream according to a particle size depending on the speed of rotation of the separating turbine.

The separating device also comprises a device 102 for extracting the particles contained in said gas stream.

The dry-type aeraulic separator 101 and the extraction device 102 are in fluidic communication such that the gas stream exiting the dry-type aeraulic separator 101 circulates through the extraction device 102 and such that the gas stream exiting the extraction device 102 circulates through the dry-type aeraulic separator 101.

This separating device also has a device 103 for circulating the gas stream between the aeraulic separator 101 and the extraction device 102. In this separating device, the dry-type aeraulic separator 101 separates the particles smaller than a first size Dc1 by removing the particles larger than Dc1 from the gas stream introduced into the separator. The particles larger than Dc1 that are removed from the gas stream will be rejected by the dry-type aeraulic separator 101 via an outlet 104. Thus, at the outlet of the dry-type aeraulic separator 101, the gas stream will virtually exclusively comprise only particles with a size less than Dc1. Next, the extraction device 102 can extract the particles from the gas stream. The particles extracted by the extraction device 102 have a size less than Dc1. The particles rejected by the aeraulic separator 101 have a size greater than Dc1.

In this embodiment, the loading of particles, for example metal particles, into the separating device can be effected in two different ways. The two solid arrows 105 and 106 represent these two ways, namely: 105 via the top of the aeraulic separator 101, and 106 via the chute 107 of the aeraulic separator 101.

In this separator 101, the size of the particles that will be separated, known as the "cut size", will depend on the speed of rotation of the separating turbine. This speed of rotation is variable via a control device.

Figure 2A:
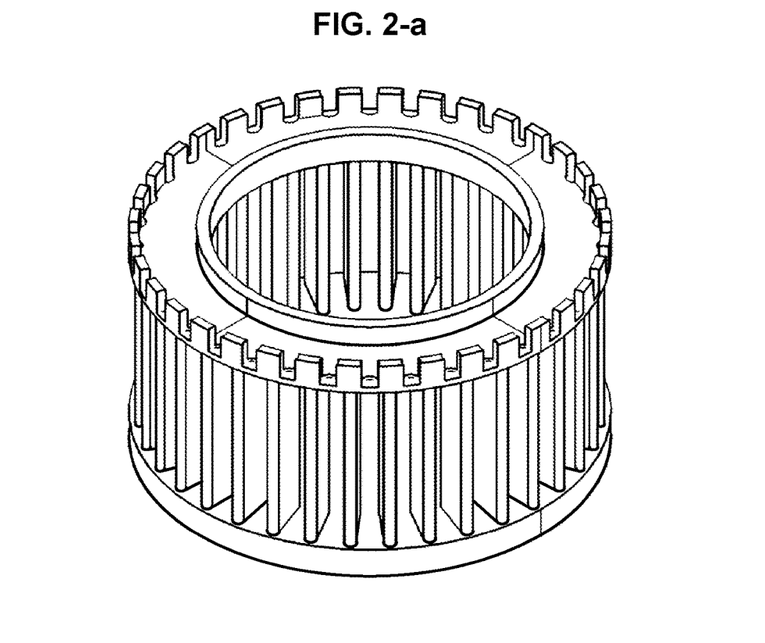
Figure 2B:
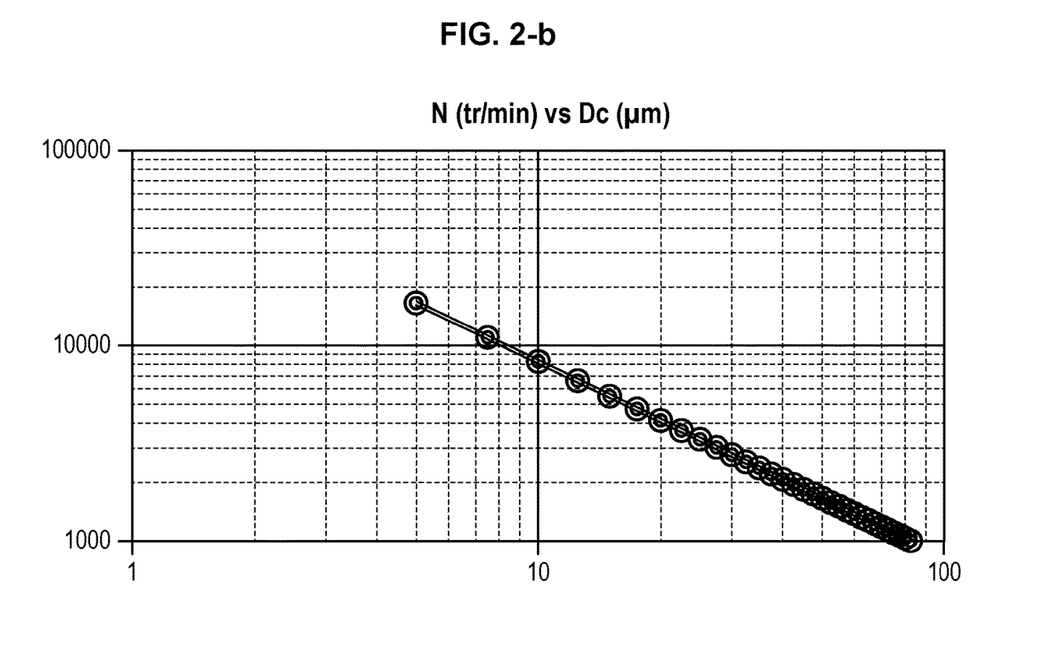

Such a separating turbine is depicted in FIG. 2-*a*. FIG. 2-*b* depicts the relationship between the speed of rotation of the separating turbine and the diameter of the particles separated by the turbine.

This device has the advantage of being able to dynamically choose the size of the particles to be extracted. It also allows better aeration, better drying and better decohesion of the particles than when the devices of the prior art are used, in particular those based on sieves. More particularly, the dry-type aeraulic separator has the advantage of being able to modify the size of the particles separated and of not clogging like a conventional sieve.

In one embodiment, the device 103 for circulating the gas stream is a fan.

In one embodiment, the device 102 for extracting said particles comprises a bag filter. It is possible for example to use a bag filter with an unclogging capability.

The bag filter has the advantage of performing better than other types of filters for the extraction of particles from a gas stream.

Figure 3:
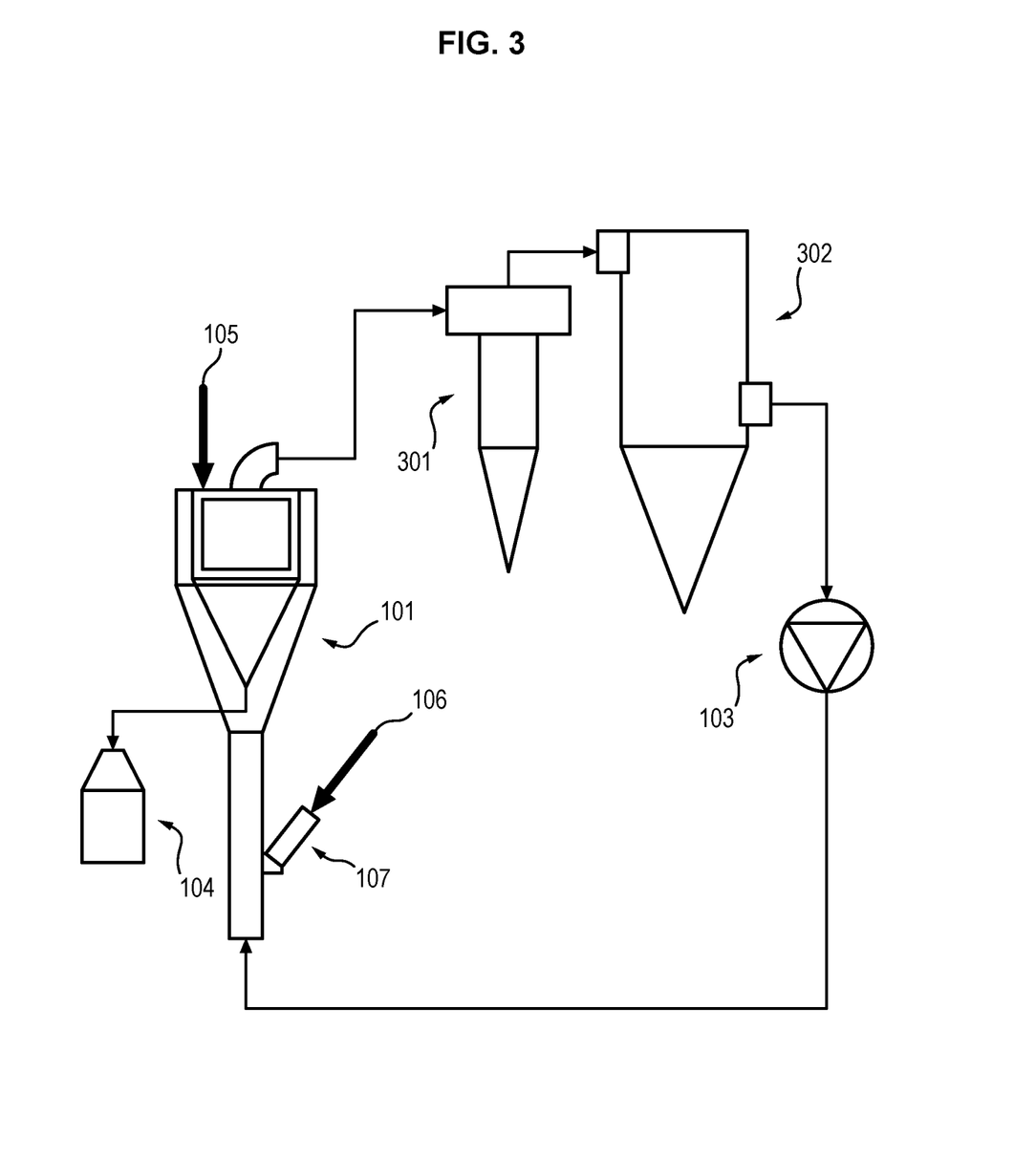
FIG. 3 illustrates a second embodiment of the separating device.

In one embodiment, shown in FIG. 3, the device 102 for extracting said particles comprises a cyclone 301 and a bag filter 302. The cyclone 301 and the bag filter 302 are in fluidic communication such that a gas stream exiting the cyclone 301 circulates through the bag filter 302.

It is possible for example to use a bag filter with an unclogging capability.

A cyclone is a device that imparts rapid rotation on a gas stream in order to separate from said gas stream the solid fine particles that are mixed in therewith.

The cyclone has the advantage of reducing the stresses applied to the bag filter.

In this embodiment, the loading of particles, for example metal particles, into the separating device can be effected in two different ways. The two solid arrows 105 and 106 depict these two ways, namely: 105 via the top of the aeraulic separator 101, and 106 via the chute 107 of the aeraulic separator 101.

Figure 4:
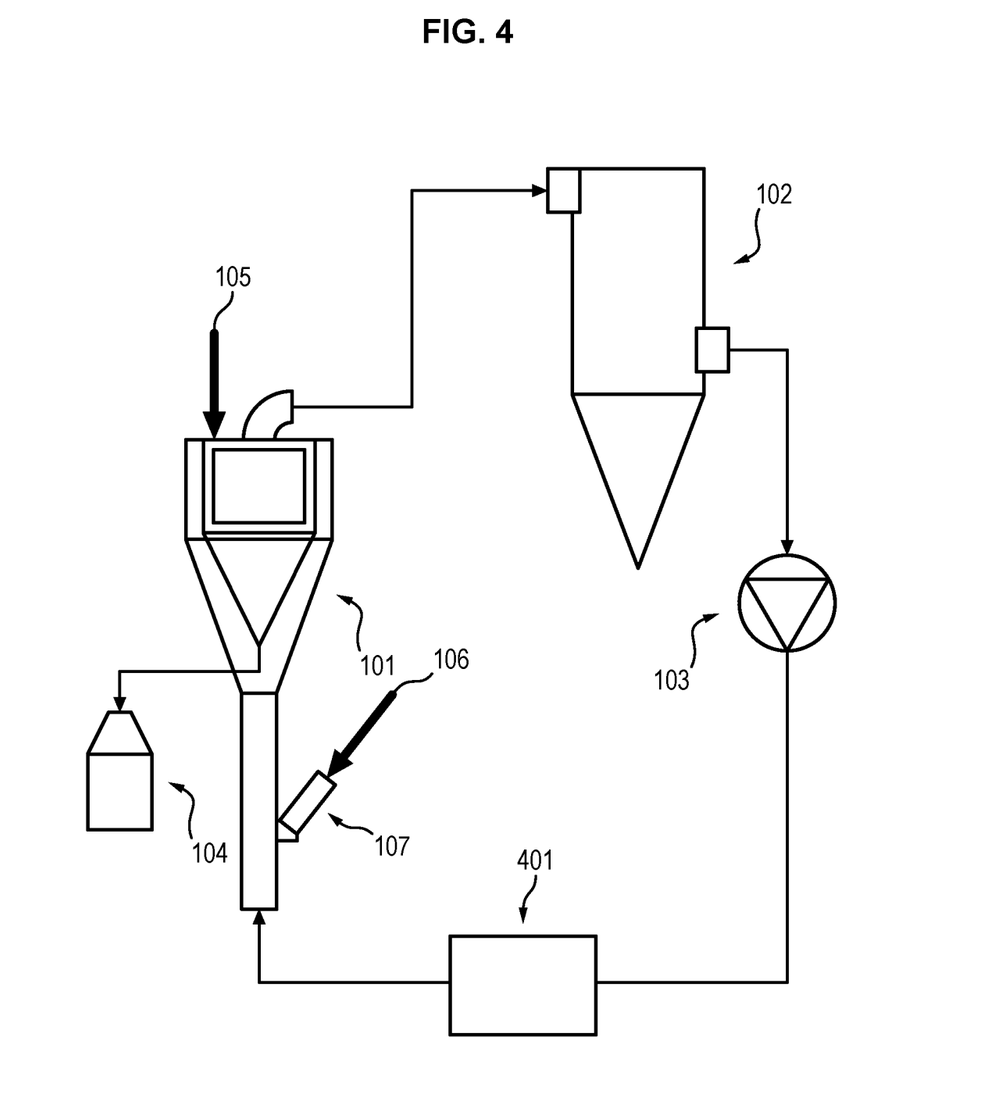
FIG. 4 illustrates a third embodiment of the separating device.

In one embodiment, shown in FIG. 4, the separating device also has a device 401 for purifying and/or dehumidifying and/or deoxygenating the gas stream.

The device 401 for purifying and/or dehumidifying and/or deoxygenating makes it possible to limit the consumption of inert gas.

In this embodiment, the loading of particles, for example metal particles, into the separating device can be effected in two different ways. The two solid arrows 105 and 106 depict these two ways, namely: 105 via the top of the aeraulic separator 101, and 106 via the chute 107 of the aeraulic separator 101.

Figure 5:
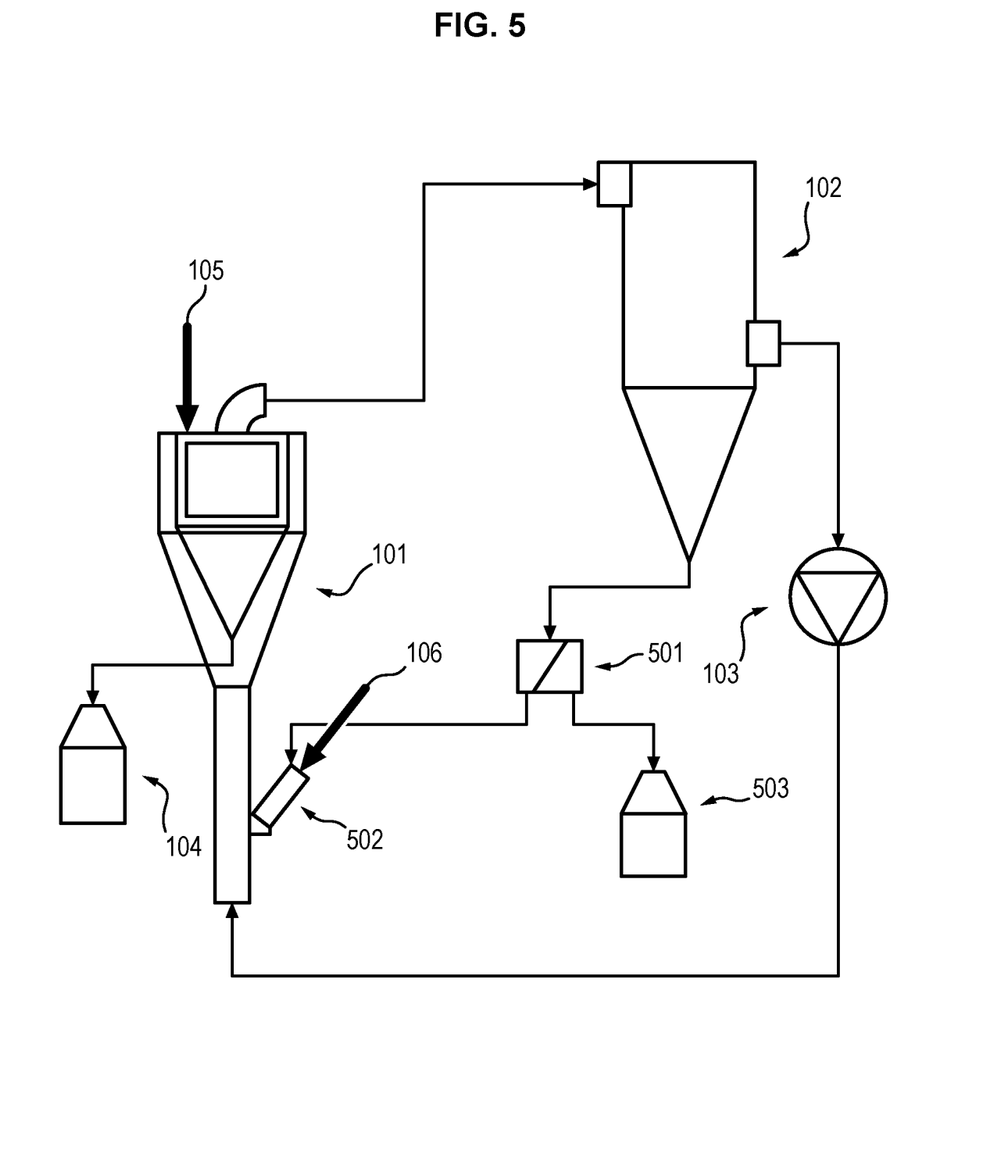
FIG. 5 illustrates a fourth embodiment of the separating device.

In one embodiment, shown in FIG. 5, the separating device also has a device 501 for selectively connecting an outlet of the extraction device 102 to an inlet 502 of the dry-type aeraulic separator 101 or to a device 503 for collecting the separated particles.

This inlet 502 of the dry-type aeraulic separator 101 is sometimes known as the chute of the aeraulic separator and allows the introduction of particles which will mix together with the particles already present in the circulating gas stream and will be processed by the dry-type aeraulic separator 101.

The presence of this device 501, making it possible to selectively connect an outlet of the extraction device 102 to an inlet 502 of the dry-type aeraulic separator 101, has the advantage of being able to ensure recirculation of the gas stream and thus of ensuring good dispersion of the particles, including when the latter are damp.

This device 501, making it possible to selectively connect an outlet of the extraction device 102 to an inlet 502 of the dry-type aeraulic separator 101, may be for example a flap.

In this embodiment, the loading of particles, for example metal particles, into the separating device can be effected in two different ways. The two solid arrows 105 and 106 depict these two ways, namely: 105 via the top of the aeraulic separator 101, and 106 via the chute 107 of the aeraulic separator 101.

Figure 6:
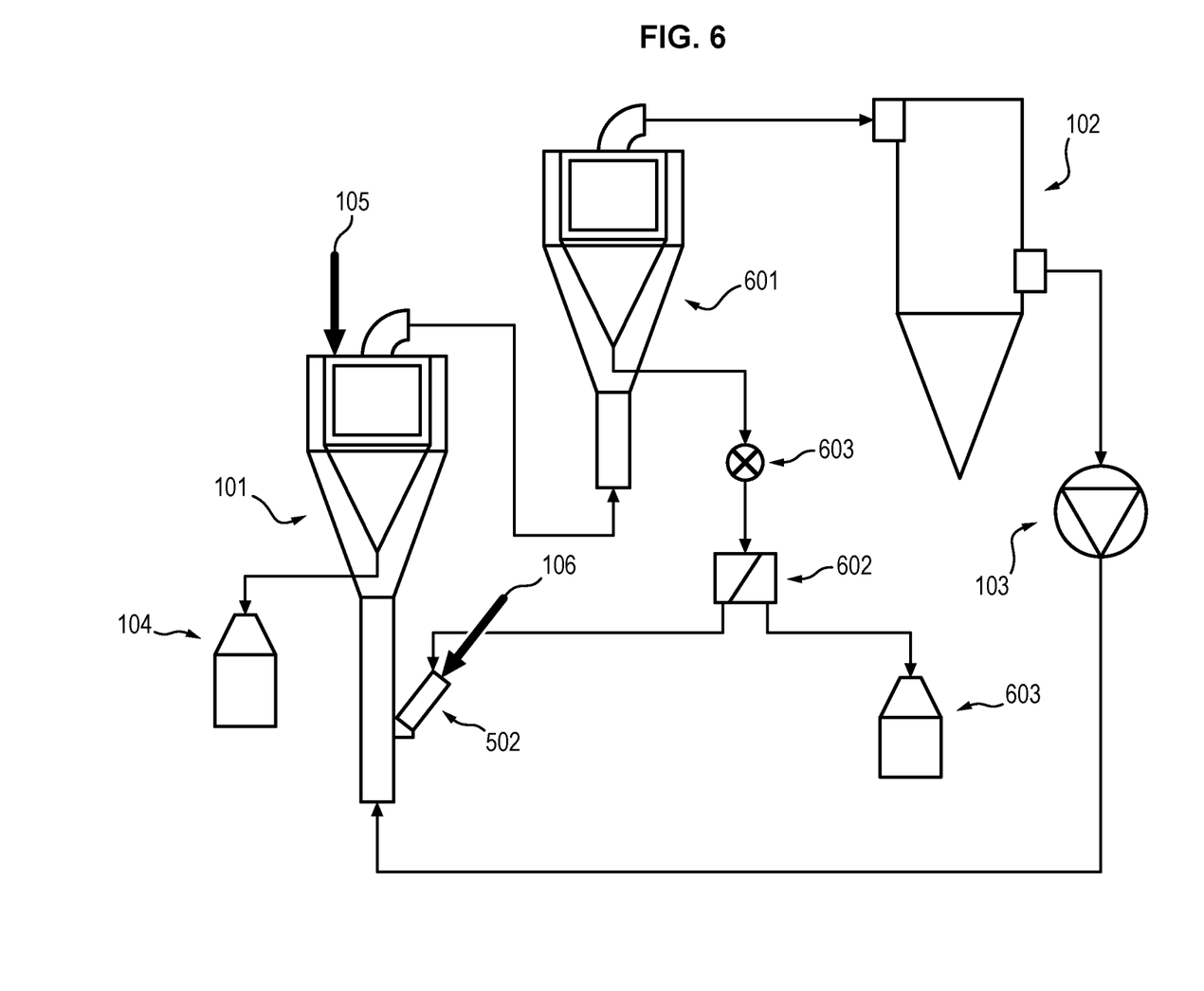
FIG. 6 illustrates a fifth embodiment of the separating device.

In one embodiment, shown in FIG. 6, the separating device has at least two dry-type aeraulic separators 101 and 601.

The two dry-type aeraulic separators 101 and 601 are in fluidic communication with one another such that a gas stream exiting one of the dry-type aeraulic separators 101 circulates through the other dry-type aeraulic separator 601.

The dry-type aeraulic separators 101 and 601 each comprise a separating turbine, a speed of rotation of which is independently variable.

The two dry-type aeraulic separators 101 and 601 each select the particles contained in the gas stream according to a particle size depending on the speed of rotation of the separating turbine.

In this embodiment, it is possible to optionally add a device 602 for selectively connecting an outlet of the dry-type aeraulic separator positioned downstream 601 to an inlet of the dry-type aeraulic separator positioned upstream 101, or to a device 603 for collecting the separated particles.

This embodiment makes it possible to select particles, for example metal particles, the size of which is within a range of values. It makes it possible to reject the particles having a diameter greater than a predetermined first diameter, and the particles having a diameter smaller than a predetermined second diameter.

Specifically, the upstream dry-type aeraulic separator 101 selects the particles smaller than a first size Dc1 by separating the particles larger than Dc1. Next, the downstream dry-type aeraulic separator 601, the turbine speed of which is adjusted to select the particles smaller than a second size Dc2, selects the particles with a size less than Dc2. Thus, and if the size Dc2 is less than the size Dc1, the particles rejected by the downstream dry-type aeraulic separator 601 will have size between Dc2 and Dc1. Optionally, it is possible to recirculate these particles with a size between Dc2 and Dc1 via the inlet 502 of the dry-type aeraulic separator 101. This recirculation makes it possible to improve drying. It is also possible to direct these particles with a size between Dc2 and Dc1 towards a collection device 603 for use. The particles extracted by the extraction device 102 have a size less than Dc2. The metal particles rejected by the upstream dry-type aeraulic separator 101 will have a size greater than Dc1.

In an application to metal additive manufacturing powders, this embodiment makes it possible to remove the metal particles that are too small (typically 3 microns 5/15) and thus to generate less in the way of fumes and particles in suspension and to obtain better focusing of the source of energy during the subsequent use of these metal particles in the additive manufacturing machine.

In this embodiment, the loading of particles, for example metal particles, into the separating device can be effected in two different ways. The two solid arrows 105 and 106 depict these two ways, namely: 105 via the top of the aeraulic separator 101, and 106 via the chute 107 of the aeraulic separator 101.

One embodiment of this invention relates to a selective additive manufacturing apparatus. This selective additive manufacturing apparatus comprises or is connected to the device, as described in the above sections, for separating particles, for example metal particles.

Thus, the selective additive manufacturing apparatus and the device for separating the particles form an assembly.

Figure 7A:
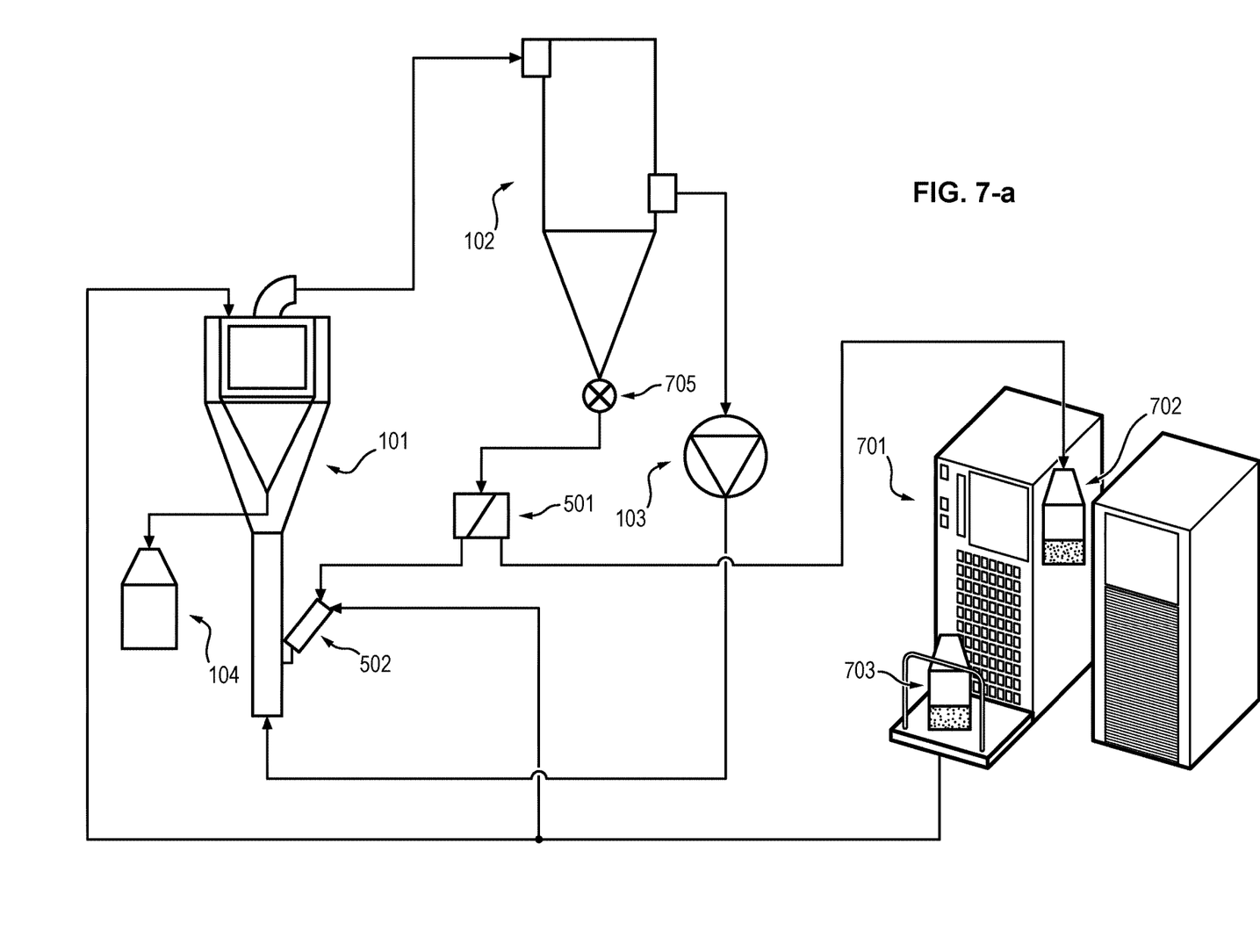
Figure 7B:
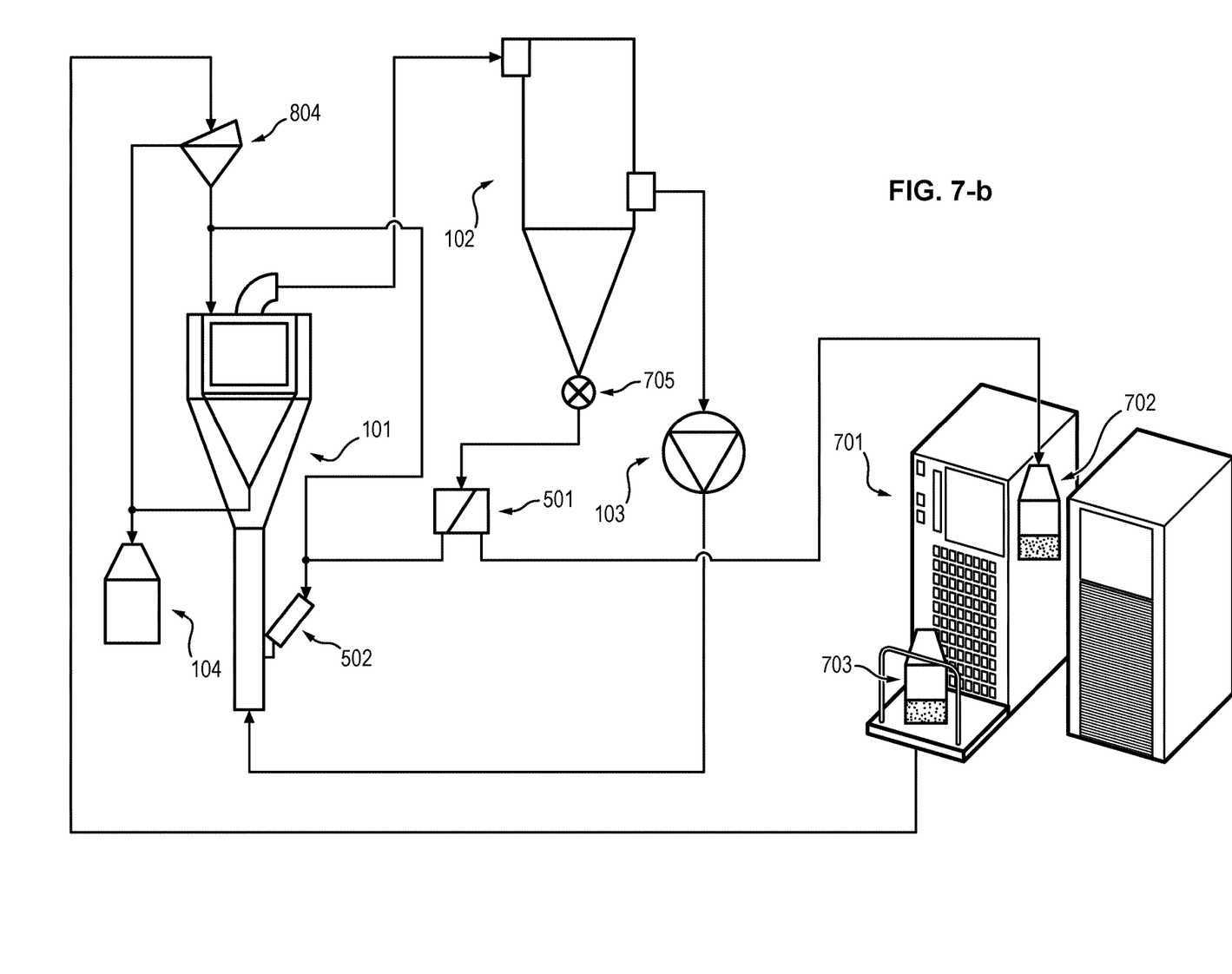

In one embodiment, illustrated in FIGS. 7-a and 7-b, the selective additive manufacturing apparatus 701 also has a system 702 for distributing a pulverulent material comprising particles, for example metal particles, this distribution system being configured to receive particles from the separating device.

In one embodiment, the selective additive manufacturing apparatus 701 has a device 703 for collecting unused particles, for example unused metal particles, the collecting device being connected to an inlet of the device for separating the particles, for example metal particles. Preferably, the inlet chosen will be the top of one of the dry-type aeraulic separators.

In one embodiment, a filtering device 704 is fitted between the collecting device 703 and the inlet of the separating device 101. This filtering device is for example a protective sieve having a preferred mesh size of 500 μm. The presence of this filtering device has the advantage of retaining the coarse dross which could damage the separating device 101.

Figure 8:
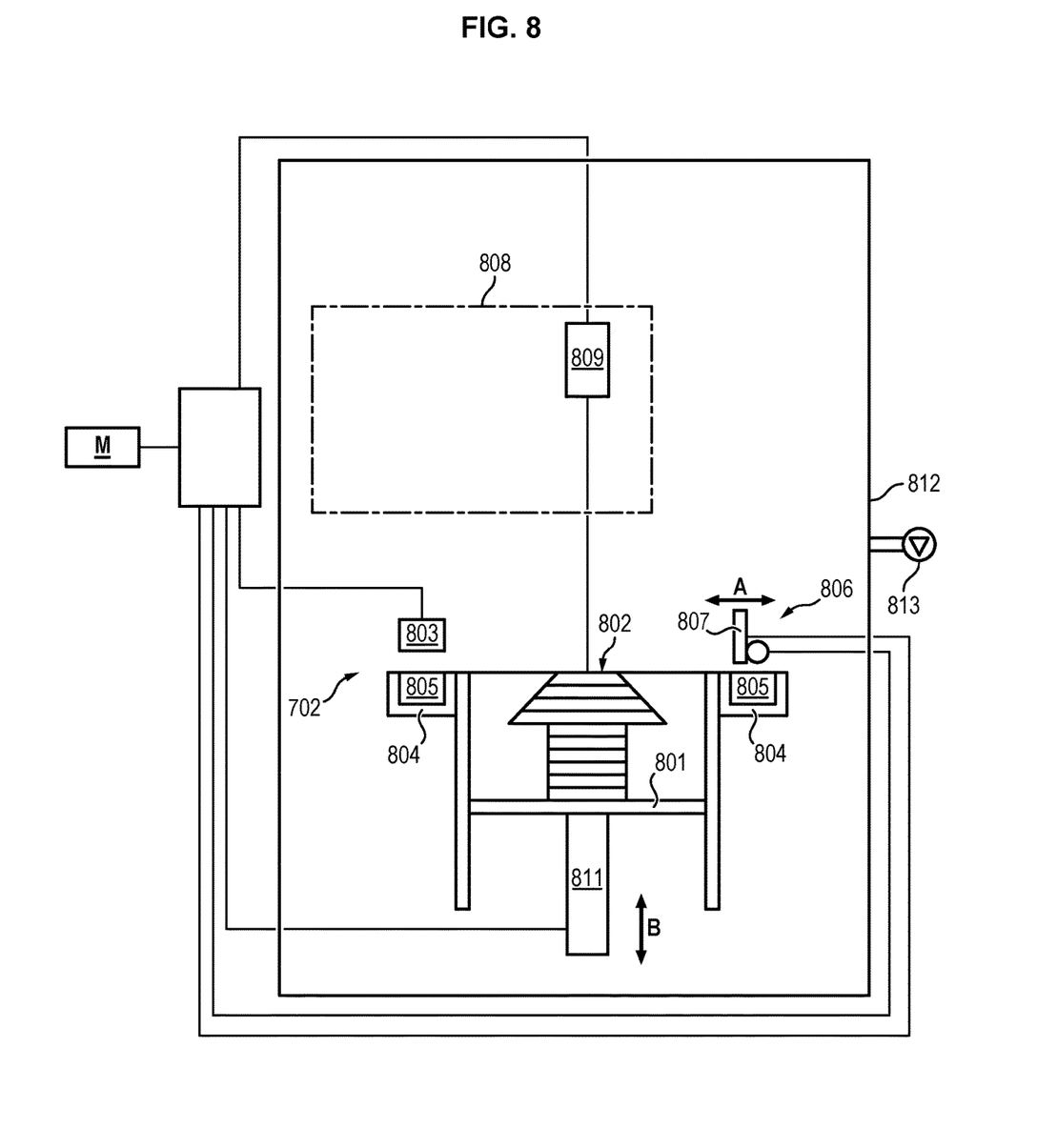
FIG. 8 shows an embodiment of a selective additive manufacturing apparatus.

FIG. 8 shows an illustration of such an additive manufacturing apparatus. This apparatus comprises:
- a support such as a horizontal plate 801 on which the various layers of additive manufacturing powder (metal powder, ceramic powder, etc.) are successively deposited, allowing a three-dimensional object to be manufactured (object 802 in the shape of a fir tree in the figure),
- a system 702 for distributing pulverulent material, designed to provide manufacturing powder at the layering roller or spreader. The distribution system 702 comprises a metering device 803, a slide 804 and a strip 805.
- an arrangement 806 for distributing said powder, for example metal powder, over the plate, this arrangement 806 comprising for example a spreader 807 and/or a layering roller for spreading the various successive layers of powder (movement along the double-headed arrow A),
- an assembly 808 having a power source 809, for example a source emitting a laser beam and/or an electron beam, for (completely or partially) fusing the thinly spread layers,
- a control unit 810 which controls the various components of the apparatus depending on pre-stored information (memory M),
- a mechanism 811 for lowering the support of the plate 801 while the layers are being deposited (movement along the double-headed arrow B).

The components of the apparatus are arranged within a sealed chamber 812 that can be connected to an inert gas circuit and/or to at least one vacuum pump 813, for example if an electron beam is used.

The invention claimed is:

1. A device for separating particles for selective additive manufacturing, the particles being contained in a gas stream, the device comprising:
  at least one dry-type aeraulic separator, the dry-type aeraulic separator comprising a separating turbine with a variable speed of rotation, and the dry-type aeraulic separator selecting the particles contained in the gas stream according to a particle size depending on a speed of rotation of the separating turbine;
  an extraction device for extracting the particles contained in the gas stream,
  wherein the at least one dry-type aeraulic separator and the extraction device are in fluidic communication such that a gas stream exiting the dry-type aeraulic separator circulates through the extraction device and such that a gas stream exiting the extraction device circulates through the dry-type aeraulic separator,
  wherein the device for separating particles also comprises a device for circulating the gas stream between the dry-type aeraulic separator and the extraction device, and
  wherein the device for separating particles further comprises a control device configured to dynamically control the variable speed of rotation of the separating turbine depending on the particle size at which the particles are to be separated.

2. The device according to claim 1, wherein the extraction device comprises a bag filter.

3. The device according to claim 1, wherein the extraction device comprises a cyclone and a bag filter, the cyclone and the bag filter being in fluidic communication such that a gas stream exiting the cyclone circulates through the bag filter.

4. The device according to claim 1, further comprising a device for purifying and/or dehumidifying and/or deoxygenating the gas stream.

5. The device according to claim 1, further comprising a device for selectively connecting an outlet of the extraction device to an inlet of the dry-type aeraulic separator or to a device for collecting the separated particles.

6. The device according to claim 1 comprising at least two dry-type aeraulic separators, the at least two dry-type aeraulic separators being in fluidic communication with one another such that a gas stream exiting one of the dry-type aeraulic separators positioned upstream circulates through the other dry-type aeraulic separator positioned downstream,
  wherein the at least two dry-type aeraulic separators each comprise a separating turbine, a speed of rotation of which is independently variable, and
  wherein the at least two dry-type aeraulic separators each select particles contained in the gas stream according to a particle size depending on the speed of rotation of the separating turbine.

7. The device according to claim 6 comprising a device for selectively connecting an outlet of the dry-type aeraulic separator positioned downstream to an inlet of the dry-type aeraulic separator positioned upstream, or to a device for collecting the separated particles.

8. An assembly comprising a selective additive manufacturing apparatus and the device according to claim 1, wherein the selective additive manufacturing apparatus comprises the device or is connected to the device.

9. The assembly according to claim 8, further comprising a system for distributing pulverulent material, the system for distributing pulverulent material being configured to receive particles coming from the device for separating the particles.

10. The assembly according to claim 8, further comprising a device for collecting unused particles that is connected to an inlet of the device for separating the particles.

11. The assembly according to claim 10, further comprising a filtering device fitted between the device for collecting unused particles and the inlet of the device for separating the particles.

12. The assembly according to claim 11, wherein the filtering device comprises a protective sieve with a mesh size of between 300 μm and 1500 μm.

* * * * *